United States Patent
Doan et al.

(10) Patent No.: US 9,881,701 B2
(45) Date of Patent: Jan. 30, 2018

(54) SPACER GRIDS WITH SPRINGS HAVING IMPROVED ROBUSTNESS

(71) Applicant: BWXT mPower, Inc., Charlotte, NC (US)

(72) Inventors: Andrew W Doan, Lynchburg, VA (US); Lewis A Walton, Forest, VA (US); George S Pabis, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 557 days.

(21) Appl. No.: 13/746,099

(22) Filed: Jan. 21, 2013

(65) Prior Publication Data

US 2014/0205053 A1  Jul. 24, 2014

Related U.S. Application Data

(60) Provisional application No. 61/625,164, filed on Apr. 17, 2012.

(51) Int. Cl.
*G21C 3/352* (2006.01)
*G21C 3/356* (2006.01)

(52) U.S. Cl.
CPC ........... *G21C 3/352* (2013.01); *G21C 3/3563* (2013.01); *Y02E 30/40* (2013.01)

(58) Field of Classification Search
CPC ...... G21C 3/352; G21C 3/356; G21C 3/3563; G21C 3/3566
USPC ................................. 376/442, 462
See application file for complete search history.

(56) References Cited

U.S. PATENT DOCUMENTS

| | | | |
|---|---|---|---|
| 3,398,053 A | | 8/1968 | Huber et al. |
| 3,801,088 A | * | 4/1974 | Piepers et al. ............... 267/164 |
| 3,844,887 A | | 10/1974 | Georges et al. |
| 3,886,038 A | | 5/1975 | Raven |
| 4,391,771 A | | 7/1983 | Anthony et al. |
| 4,396,573 A | * | 8/1983 | Feutrel ......................... 376/442 |
| 4,426,355 A | | 1/1984 | Burger |
| 4,702,881 A | | 10/1987 | Weiland et al. |
| 4,851,181 A | | 7/1989 | Takeda et al. |

(Continued)

FOREIGN PATENT DOCUMENTS

| CN | 85109302 A | 8/1986 |
|---|---|---|
| CN | 56102224 A | 11/1986 |

(Continued)

OTHER PUBLICATIONS

Extended European Search Report dated Nov. 23, 2015 for European Application No. 13781593.2.

(Continued)

*Primary Examiner* — Jack W Keith
*Assistant Examiner* — Sharon M Davis
(74) *Attorney, Agent, or Firm* — Nelson Mullins Riley & Scarborough LLP

(57) ABSTRACT

A spacer grid includes intersecting straps defining cells with springs and dimples arranged to hold fuel rods passing through the cells. The springs are dual cantilevered springs with a bridge section between the distal end of the spring and the base. The distal portion of the spring is less stiff than the bridge section. The bridge section creates a bump which acts as a stop or travel limiter to prevent loss of grip force due to excessive spring deflection.

20 Claims, 9 Drawing Sheets

(56) References Cited

U.S. PATENT DOCUMENTS

| | | | |
|---|---|---|---|
| 4,885,127 | A | 12/1989 | Yokoyama |
| 4,895,698 | A | 1/1990 | DeMario |
| 4,923,669 | A | 5/1990 | DeMario |
| 4,957,697 | A | 9/1990 | Wada |
| 4,966,745 | A | 10/1990 | Widener et al. |
| 4,990,304 | A | 2/1991 | Rylatt |
| 4,994,233 | A | 2/1991 | Freeman |
| 4,996,018 | A | 2/1991 | Bhatt et al. |
| 5,009,837 | A | 4/1991 | Nguyen et al. |
| 5,024,806 | A | 6/1991 | Cioffi et al. |
| 5,030,413 | A | 7/1991 | Knierriem et al. |
| 5,043,134 | A | 8/1991 | Widener et al. |
| 5,068,083 | A | 11/1991 | John, Jr. et al. |
| 5,158,740 | A | 10/1992 | Boatwright |
| 5,207,980 | A | 5/1993 | Gilmore et al. |
| 5,265,137 | A | 11/1993 | Busch |
| 5,268,948 | A | 12/1993 | Church et al. |
| 5,282,231 | A | 1/1994 | Adams et al. |
| 5,282,233 | A | 1/1994 | Bryan |
| 5,289,513 | A | 2/1994 | DeMario et al. |
| 5,299,246 | A | 3/1994 | Bryan |
| 5,367,549 | A | 11/1994 | Hatfield |
| 5,434,898 | A | 7/1995 | Barkhurst |
| 5,436,945 | A | 7/1995 | Weisel et al. |
| 5,513,234 | A | 4/1996 | Rottenberg |
| 5,640,434 | A | 6/1997 | Rottenberg |
| 6,055,288 | A | 4/2000 | Schwirian |
| 6,088,420 | A | 7/2000 | Yokoyama et al. |
| 6,130,927 | A | 10/2000 | Kang et al. |
| 6,167,105 | A | 12/2000 | Yoon et al. |
| 6,275,557 | B2 | 8/2001 | Nylund et al. |
| 6,542,567 | B1 | 4/2003 | Mayet et al. |
| 6,636,578 | B1 | 10/2003 | Clark |
| 6,636,580 | B2 | 10/2003 | Murakami et al. |
| 6,744,843 | B2 | 6/2004 | Kang et al. |
| 6,807,246 | B1 | 10/2004 | Kim et al. |
| 6,810,099 | B2 | 10/2004 | Nakamaru et al. |
| 6,819,733 | B2 | 11/2004 | Broders et al. |
| 6,865,242 | B2 | 3/2005 | Barbe et al. |
| 6,895,067 | B2 | 5/2005 | Borum et al. |
| 7,085,340 | B2 | 8/2006 | Goldenfield et al. |
| 7,257,185 | B1 | 8/2007 | Yamada et al. |
| 7,280,946 | B2 | 10/2007 | Russell, II et al. |
| 7,424,412 | B2 | 9/2008 | Kropaczek et al. |
| 7,428,479 | B2 | 9/2008 | Boer et al. |
| 7,453,972 | B2 | 11/2008 | Hellandbrand, Jr. et al. |
| 7,526,058 | B2 | 4/2009 | Fawcett et al. |
| 7,548,602 | B2 | 6/2009 | Smith, III et al. |
| 7,561,654 | B2 | 7/2009 | Makovicka et al. |
| 7,574,337 | B2 | 8/2009 | Kropaczek et al. |
| 7,623,612 | B2 | 11/2009 | Marzean et al. |
| 7,668,280 | B2 | 2/2010 | Hellandbrand, Jr. et al. |
| 7,668,284 | B2 | 2/2010 | Sparrow et al. |
| 7,769,125 | B2 | 8/2010 | Yoon et al. |
| 7,835,484 | B2 | 11/2010 | Eom et al. |
| 2003/0012329 | A1 | 1/2003 | Yoon et al. |
| 2003/0123600 | A1 | 7/2003 | Hesketh et al. |
| 2003/0169839 | A1 | 9/2003 | Matteson |
| 2005/0069080 | A1* | 3/2005 | Goldenfield et al. ......... 376/438 |
| 2006/0153327 | A1 | 7/2006 | Jiang |
| 2006/0222140 | A1 | 10/2006 | Aleshin et al. |
| 2006/0251205 | A1 | 11/2006 | Balog |
| 2007/0133732 | A1 | 6/2007 | Nakayama et al. |
| 2007/0206717 | A1 | 9/2007 | Conner et al. |
| 2007/0223646 | A1 | 9/2007 | Marzean et al. |
| 2007/0242793 | A1 | 10/2007 | Song et al. |
| 2008/0084957 | A1 | 4/2008 | Aleshin et al. |
| 2008/0232537 | A1 | 9/2008 | Reparaz et al. |
| 2009/0032178 | A1 | 2/2009 | Feinroth |
| 2012/0051482 | A1 | 3/2012 | Shargots et al. |

FOREIGN PATENT DOCUMENTS

| | | |
|---|---|---|
| WO | 2012160003 | 11/2012 |
| WO | 2013165488 | 11/2013 |

OTHER PUBLICATIONS

International Search Report and Opinion for PCT/US2013/025048 dated Nov. 13, 2013.

Office Action dated Mar. 18, 2016 for Chinese Application No. 201380031756.6.

* cited by examiner

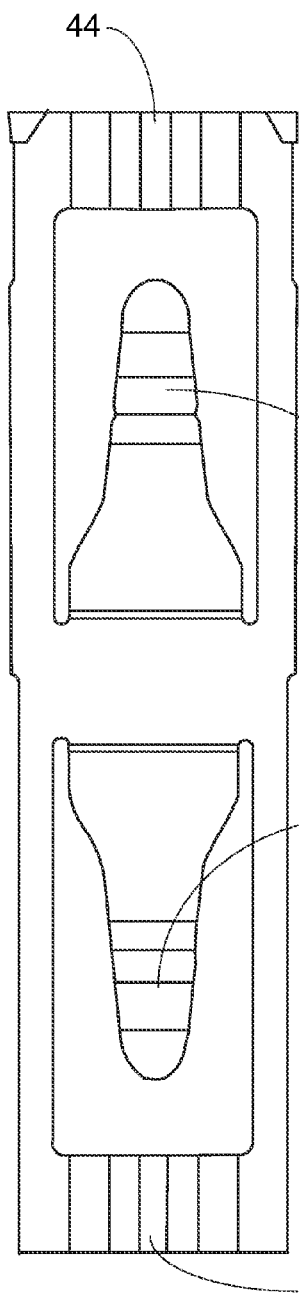
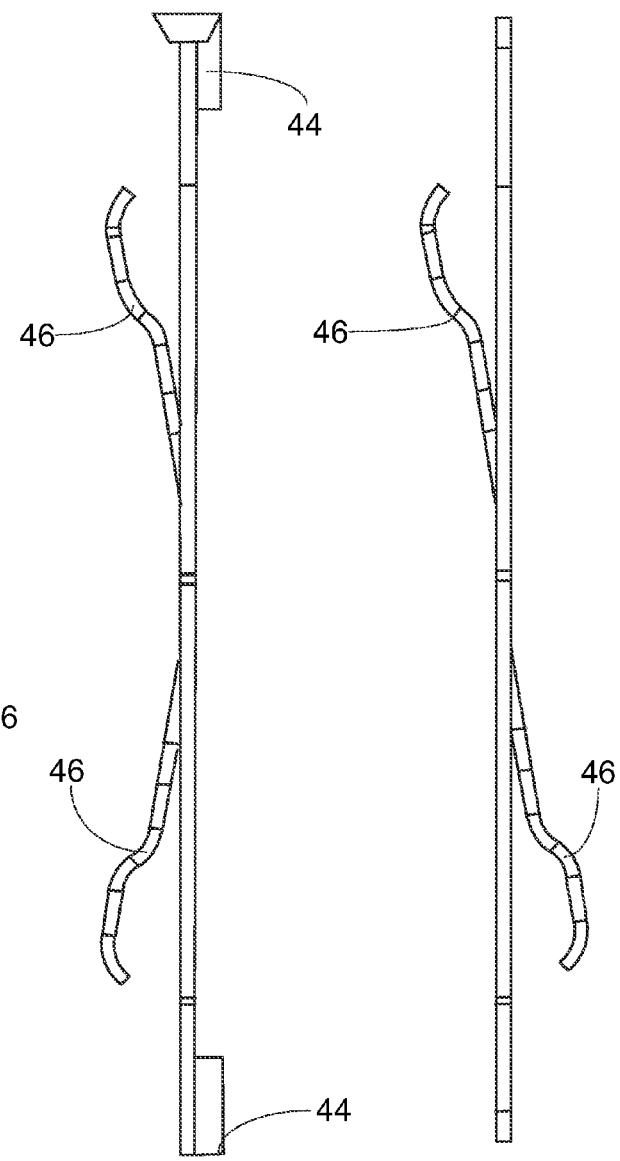
FIG. 8  FIG. 9  FIG. 10

| | KEY FOR FIGURE 15 GRID |
|---|---|
| | Standard fuel rod |
| | Guide tube |
| | Fuel rod location with a single contact spring |
| | Single contact spring location |
| X | Fuel rod location with a single spring in both directions |
| O | Location where fuel rod would have a single contact spring at every elevation if the grids were rotated |
| I | Instrument guide tube cell where spring direction transition is made |
| T | Guide tube cell where spring direction transition is made |
| ↕ | Vertical transition |
| ↔ | Horizontal transition |
| + | Transition in both directions |

FIG. 14

SPACER GRIDS WITH SPRINGS HAVING IMPROVED ROBUSTNESS

This application claims the benefit of U.S. Provisional Application No. 61/625,164 filed Apr. 17, 2012. U.S. Provisional Application No. 61/625,164 filed Apr. 17, 2012 is hereby incorporated by reference in its entirety.

BACKGROUND

The following relates to the nuclear fuel arts, nuclear reactor arts, nuclear power generation arts, and related arts.

A nuclear reactor core is typically constructed as an array of fuel assemblies (FA's) in which each FA is vertically coextensive with the height of the reactor core and the array of FA's spans the lateral dimensions of the reactor core. Each FA comprises an array of vertically oriented fuel rods held together by a structural skeleton comprising a set of horizontal spacer grids spaced apart along the vertical direction which are welded to guide tubes or other rod-like vertical elements. The upper and lower ends of the FA are capped by upper and lower end fittings (also sometimes called nozzles) connected to the guide tubes by fasteners, welding, or the like.

Conventional spacer grids are constructed by interlocking straps, where each strap is machined (e.g. stamped) from a strip of metal, such as a nickel-chromium alloy (e.g., Inconel™) strip or a zirconium alloy (e.g., Zircaloy™) strip. The intersecting straps define openings, also called cells, through which fuel rods pass. The straps are machined or stamped to define dimples (i.e., "hard" stops, protrusions having high stiffness) and springs (i.e. "soft" stops, protrusions having low stiffness) in each cell to hold the fuel rod passing through the cell. Typically two dimples are formed from the straps forming two adjacent walls in each square cell. One dimple in each pair is located near the top of the grid strap and the other is located near the bottom of the grid strap. The opposite cell walls each contain a single spring which may either be formed from the strap that makes that cell wall, or in the case of a bi-metallic spacer grid, may be an insert made of a different material that is mechanically trapped or restrained by features formed from the strap that make up that cell wall. The springs are located at or near the mid-plane of the spacer grid, and are sized so that an interference condition exists when a fuel rod is inserted into the grid cell. This interference causes the springs to deflect backwards towards the cell walls on which they are located, preloading the fuel rod in two orthogonal directions against the opposing dimple pair and clamping it in position. The axial offset between the plane of action of the springs and the plane of action of the dimples creates restoring moments that cause the local vertical orientation of the fuel rod at the spacer grids to remain relatively fixed should lateral forces be applied to the fuel rod between any two axially adjacent spacer grids.

Adverse handling conditions can produce high accelerations on the fuel rods which in turn may over-deflect the springs. Springs that are deflected past the normal fuel rod location may be plastically deformed and lose grip force on the fuel rod. Springs may also bottom out, allowing the fuel rod to contact the grid.

The following discloses various improvements.

SUMMARY

In one embodiment, a spacer grid includes a plurality of intersecting straps having springs and dimples formed into the straps, the intersecting straps defining cells with the springs and dimples arranged to engage fuel rods passing through the cells. At least one of the springs in the spacer grid is cantilevered with a bridge region disposed between a distal end of the cantilevered spring and a base of the cantilevered spring.

In accordance with another aspect, a spacer grid including a plurality of intersecting straps having springs and dimples formed into the straps, the intersecting straps defining cells with the springs and dimples arranged to engage fuel rods passing through the cells. At least one of the springs in the spacer grid is cantilevered with a first contact surface and a secondary contact surface formed by a bump and spaced apart from the first contact surface, the secondary contact surface having at least an order of magnitude higher stiffness than the first contact surface and located between a base of the spring and the first contact surface.

In accordance with another aspect, a spacer grid including intersecting straps having springs and dimples formed into the straps, the intersecting straps defining cells with the springs and dimples arranged to hold fuel rods passing through the cells. At least one of the springs in the spacer grid is a cantilevered spring with a contact surface and a bump spaced apart from the contact surface and disposed along the cantilevered spring between the contact surface and a base of the cantilevered spring, the bump limiting travel of the spring.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 3 shows a side view of an interior strap; FIG. 4 shows a perspective view of the spacer grid; FIG. 5 shows a side view of an outer strap; FIGS. 6 and 7 show alternative spring contact surface designs.

FIGS. 8 and 9 show front and side views respectively of a dual cantilever spring/dimples contacting structure of an interior strap.

FIG. 10 shows a side view of a transition strap with an "S"-shaped dual cantilever spring configuration.

FIG. 14 shows a key defining symbols and representations used in FIG. 15.

DETAILED DESCRIPTION OF THE PREFERRED EMBODIMENTS

Figure 1:
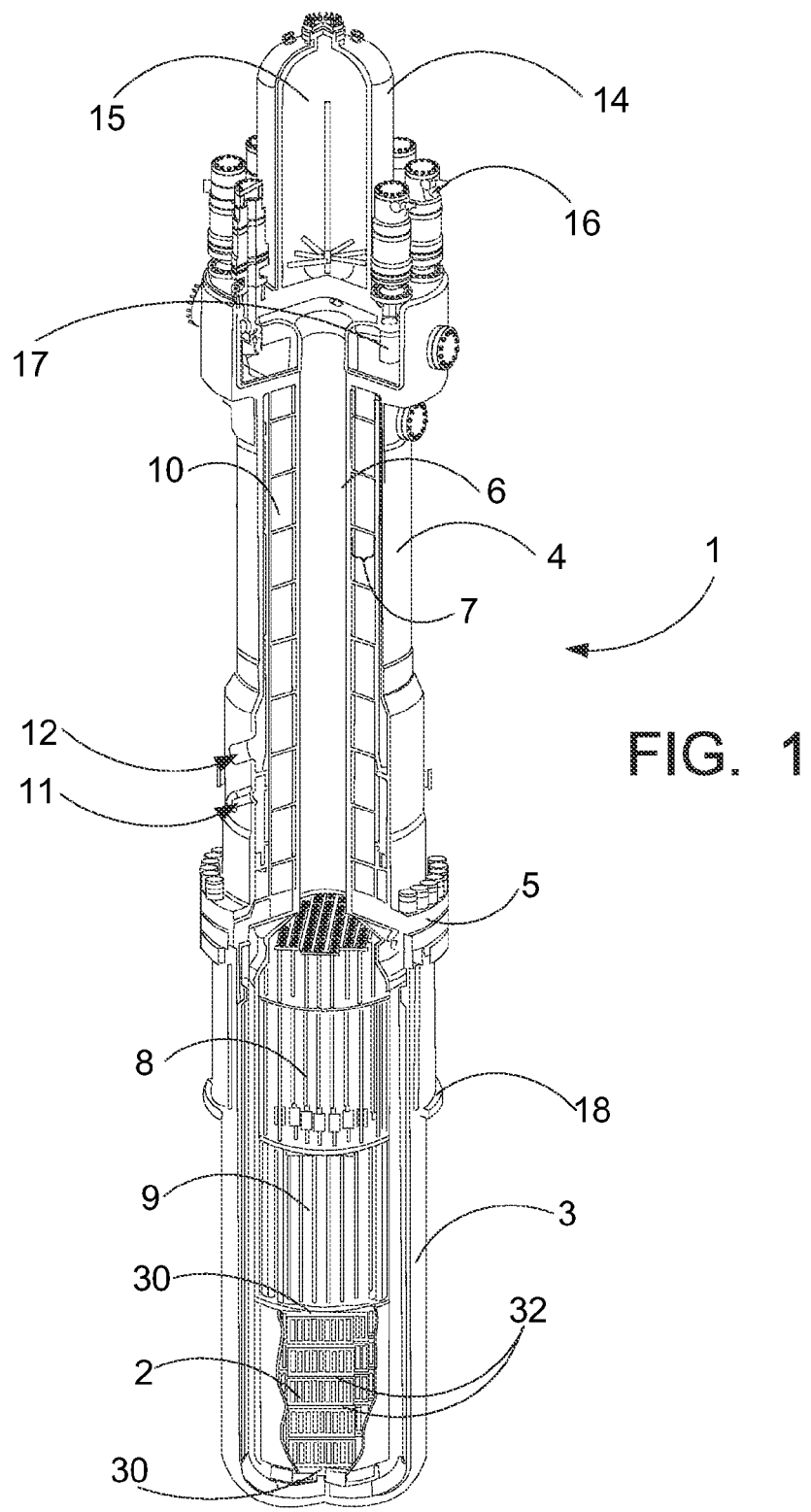
FIG. 1 diagrammatically shows a perspective partial sectional view of an illustrative nuclear reactor of the pressurized water reactor (PWR) variety with internal steam generators (integral PWR).

With reference to FIG. 1, an illustrative nuclear reactor 1 of the pressurized water reactor (PWR) variety is shown.

The illustrative PWR 1 includes a nuclear reactor core 2 disposed in a pressure vessel which in the illustrative embodiment comprises a lower vessel portion 3 and an upper vessel portion 4 connected by a mid-flange 5. The reactor core 2 is disposed in the lower vessel portion 3, and comprises fuel rod containing a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 that control insertion of control rods to control reactivity; however, the reactor can alternatively employ external CRDMs. In either case, guide frame supports 9 guide the translating control rod assembly (e.g., each including a set of control rods comprising neutron absorbing material yoked together by a spider and connected via a connecting rod with the CRDM). The illustrative PWR 1 employs internal steam generators 10 located inside the pressure vessel, but embodiments with the steam generators located outside the pressure vessel (i.e., a PWR with external steam generators) are also contemplated. The illustrative steam generators 10 are of the once-through straight-tube type with internal economizer, and are fed by a feedwater inlet 11 and deliver steam to a steam outlet 12. The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs) comprising in the illustrative example external RCP motors 16 driving an impeller located in a RCP casing 17 disposed inside the pressure vessel. The illustrative PWR 1 also includes an optional support skirt 18. It is to be appreciated that the PWR 1 is merely an illustrative example—the disclosed spacer grids and fuel assemblies including same are suitably employed in substantially any type of PWR as well as in nuclear reactors of other types such as boiling water reactor (BWR) designs.

Figure 2:
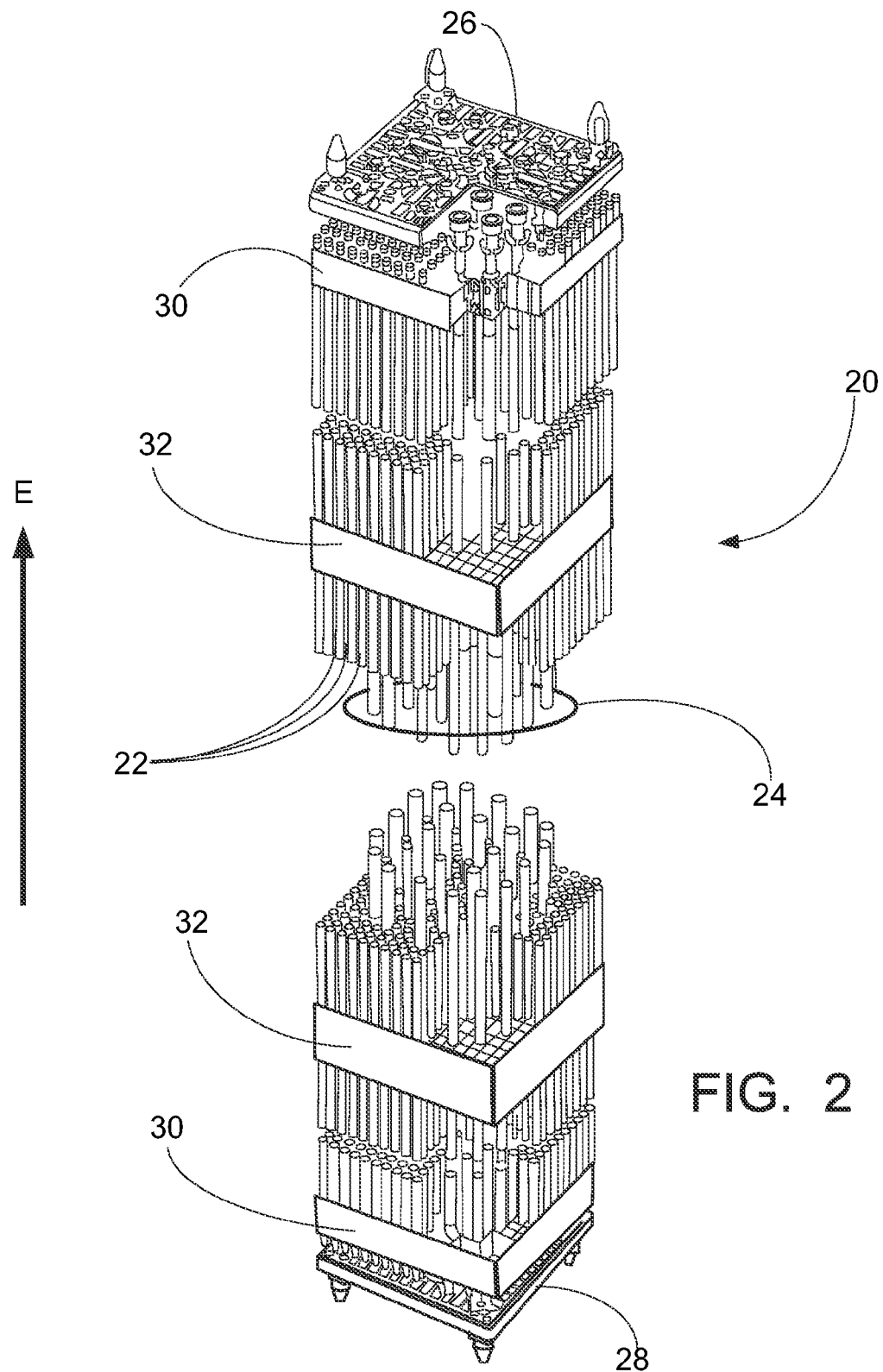
FIG. 2 diagrammatically shows a perspective view of one of the fuel assemblies of the nuclear reactor core of the nuclear reactor of FIG. 1.

With reference to FIG. 2, a representative fuel assembly 20 is diagrammatically shown with partial breakaway and the front top corner of the perspective view cut away to reveal internal components. The fuel assembly 20 is suitably employed as an element of the nuclear reactor core 2 disposed in the pressure vessel of FIG. 1. The fuel assembly 20 includes an array of vertically oriented fuel rods 22 each comprising a fissile material such as $^{235}$U. For example, each fuel rod may contain enriched uranium dioxide ($UO_2$) or mixed $UO_2$/gadolinium oxide ($UO_2$—$Gd_2O_3$) pellets. Interspersed amongst the fuel rods 20 are guide tubes 24 that provide conduits for control rods, instrumentation, or so forth. The top of the fuel assembly 20 is terminated by an upper end fitting or nozzle 26 and the bottom of the fuel assembly 20 is terminated by a lower end fitting or nozzle 28. The vertical direction of the fuel assembly 20 is denoted as the vertical or "elevation" direction E in FIG. 2.

The fuel assembly 20 is held together by a plurality of spacer grids including end grids 30 disposed near the top and bottom of the fuel assembly 20 and one or (typically) more mid-grids 32 disposed at spaced apart positions between the top and bottom of the fuel assembly 20. (Said another way, each end spacer grid 30 is closer to an end of the bundle of fuel rods 22 than the mid-grid 32). Illustrative FIG. 2 shows only two mid-grids 32, but typically additional mid-grids are present which are omitted in the cutaway illustration. The number of mid-grids, and the spacing of the end grids and mid grids along the height of the fuel assembly, is determined based on the total length of the bundle of fuel rods, the total number of fuel rods in the bundle, the structural characteristics of the fuel rods, applicable regulatory requirements, and so forth. As indicated diagrammatically in FIG. 1, the grids 30, 32 of all fuel assemblies typically are aligned with each other so that any contact between adjacent fuel assemblies is grid-to-grid contact. (Such uniformity among the fuel assemblies is also advantageous from a manufacturing standpoint). The grids 30, 32 comprise interlocking metal straps formed from metal sheets by stamping or other machining techniques. The metal may be a nickel-chromium alloy (e.g., Inconel), or a zirconium alloy (e.g., Zircaloy), or so forth. Inconel is stronger than Zircaloy; however, Zircaloy has a smaller neutron absorption cross-section as compared with Inconel. Thus, in some embodiments the end grids 30 are made of Inconel while the mid-grids 32 are made of Zircaloy.

Figure 3:
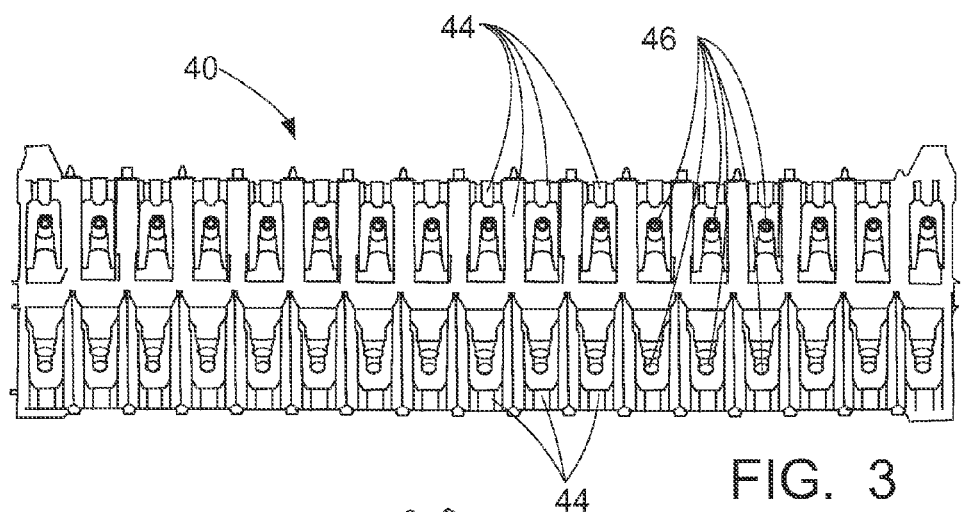
FIGS. 3-7 diagrammatically show one of the spacer grids of the fuel assembly of FIG. 2, where.
Figure 4:
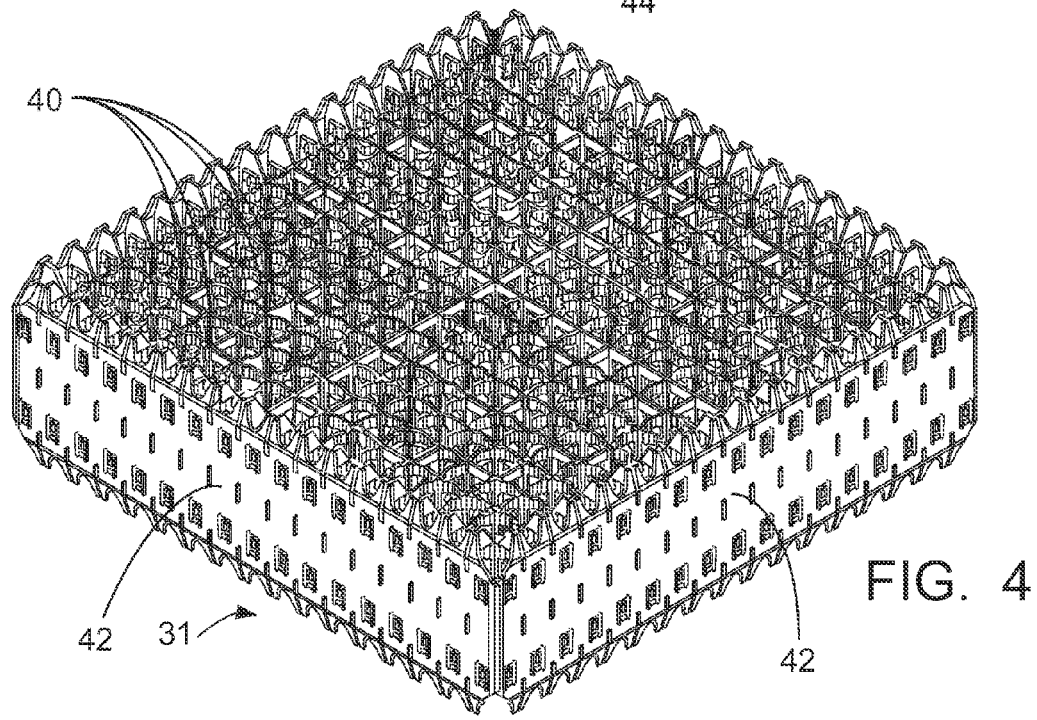
Figure 5:
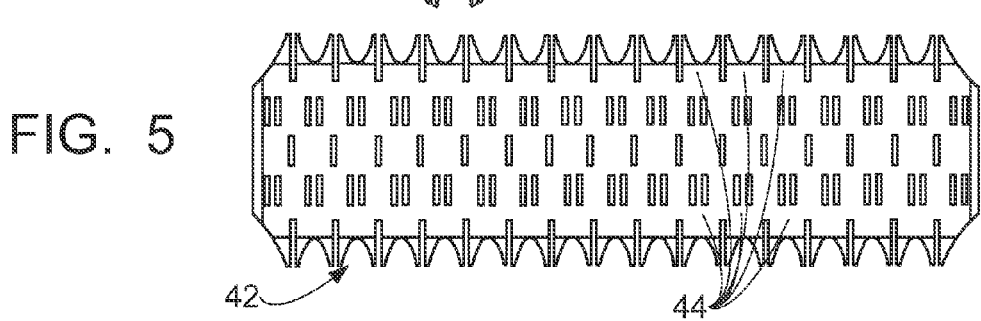

With reference to FIGS. 3-5, some design features of some illustrative spacer grids disclosed herein are shown. FIG. 4 shows a perspective view of an illustrative spacer grid 31 (where the grid 31 may in general serve as either one of the end grids 30 or one of the mid-grids 32 shown in FIG. 2). FIG. 3 shows an interior strap 40 of the grid 31, while FIG. 5 shows an outer strap 42 of the grid 31. Each standard cell defined by intersecting interior straps contains horizontally oriented dimple features (or stops) 44 at the top and bottom edges sandwiched around a pair of vertically-oriented cantilever spring features 46. The cantilever spring features 46, which are designed to have a large elastic deflection range compared with the dimples 44, are formed with their main surfaces inclined relative to the remainder of the vertical cell wall so as to create a substantial interference with the fuel rod. When the fuel rod is inserted into the fuel assembly during manufacturing, these dual spring features 46 are deflected back towards the vertical cell wall, creating a clamping force that pins the fuel rod against the opposing dimple pair 44. This same clamping action is simultaneously actuated at 90 degrees around the cladding by the spring and dimple features in the perpendicular cell walls. The outer straps 42 on the illustrative spacer grids 31 contain dimple features 44 only. This configuration has an advantage over grid designs that have spring features on the outer straps in that the material cutouts on the outer strap are minimized, enhancing the structural strength of the outer straps.

The spring and dimple features are replaced in the guide tube cells with saddle features that position the control rod guide tubes accurately without generating any appreciable clamping force. Rather, the guide tubes are welded to the grids 31 to form (optionally along with the nozzles 26, 28) the structural skeleton of the fuel assembly 20. Optional integral tabs on the top and bottom edges of the interior grid straps in these special cells (not shown) are used to attach the mid-grids 32 to the control rod guide tubes permanently during fuel assembly manufacturing.

Figure 6:
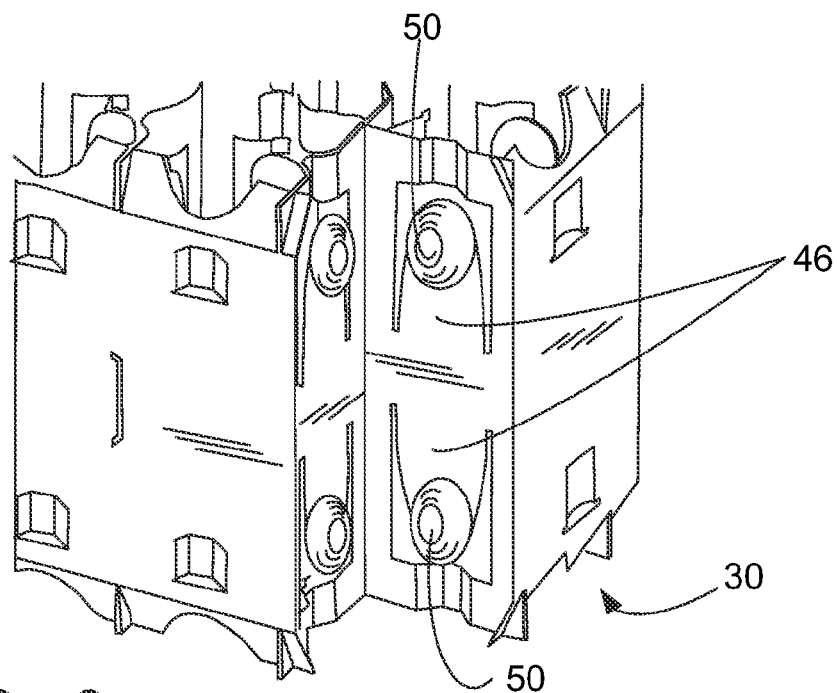
Figure 7:
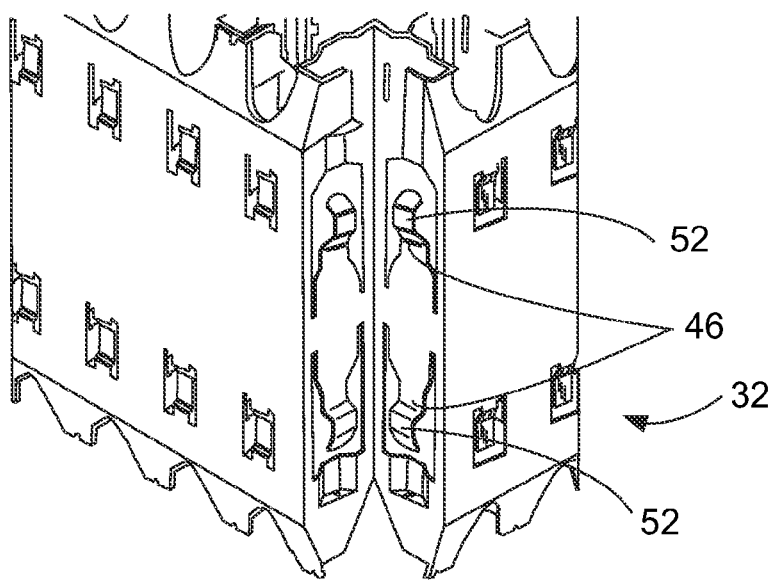

With reference to FIGS. 6 and 7, the contact surfaces of the springs 46 of the interior straps 40 can have various shapes. In choosing the shape of the contact surfaces, factors such as fuel rod lead-in, ductility or brittleness of the material, and so forth are suitably taken into account. For example, if the end-grids 30 are made of Inconel, which is relatively ductile, the contact surfaces can be shaped as flat-topped domes 50 to provide good lead-in/fuel rod engagement surfaces for the springs. On the other hand, if the mid-grids 32 are made of less formable Zircaloy, then the contact surfaces can be shaped as more simple-to-manufacture hooks 52 formed by bending the free ends of the springs as to include a flat rod engagement portion and a distal "bent-back" portion that facilitates lead-in.

The spacer grid 31 of FIGS. 3-5 is designed to avoid having springs in the outer straps 42, and all of the springs 46 in the spacer grid 31 face from the center of the grid outward. Accordingly, there is a transition point or points in the grid where the spring direction reverses. In the spacer grid 31, this spring direction transition occurs near the center of the grid; however, it may occur elsewhere in other spacer grid designs.

With reference to FIGS. 8 and 9, a single fuel rod engagement portion is shown in front profile and side profile respectively, illustrating the dimples 44 and springs 46. Note that the dimples 44 shown in FIGS. 8 and 9 engage one cell (namely the cell "behind" in FIG. 8 or "to the right" in FIG. 9) while the springs 46 engage another cell (namely the cell "in front" in FIG. 8 or "to the left" in FIG. 9).

The spacer grid 31 includes a plurality of intersecting straps 40, 42 having springs 46 and dimples 44 formed into the straps. The intersecting straps 40, 42 define cells with the springs and dimples arranged to engage (i.e., hold) fuel rods passing through the cells. The intersecting straps 40, 42 include (i) a first set of mutually parallel straps including a first transition strap and (ii) a second set of mutually parallel straps including a second transition strap, the second set of mutually parallel straps intersecting the first set of mutually parallel straps. The springs 46 formed into the interior straps 40 of the first set of mutually parallel straps (other than the first transition strap) face away from the first transition strap, and the springs 46 formed into the interior straps 40 of the second set of mutually parallel straps (other than the second transition strap) face away from the second transition strap. Similarly, the dimples 44 formed into the straps of the first set of mutually parallel straps (other than the first transition strap) face toward the first transition strap and the dimples 44 formed into the straps of the second set of mutually parallel straps (other than the second transition strap) face toward the second transition strap.

With reference to FIG. 10, to utilize two grid transition straps to make the transition (one in each direction orthogonal to each other, i.e. the aforementioned first transition strap and second transition strap), the dual contact cantilever spring of FIGS. 8 and 9 is replaced in the transition straps with an "S" shaped, single contact spring configuration shown in FIG. 10 in which the directions of the upper and lower springs 46 are reversed. Additionally, there is no need for the dimples 44 on the grid straps of FIG. 10 as at the transition both sides engage the proximate fuel rods via the springs 46. In the transition strap of FIG. 10, one half of the springs face in one direction and the other half of the springs face in the opposite direction. In other embodiments the transition can be accommodated in other ways. For example, the strap with "S" shaped, single contact springs as per FIG. 10 can be replaced by two back-to-back straps without the dimples and with springs of the design of FIGS. 8 and 9, with the springs of the two back-to-back straps both facing outward in opposite directions.

Figure 11:
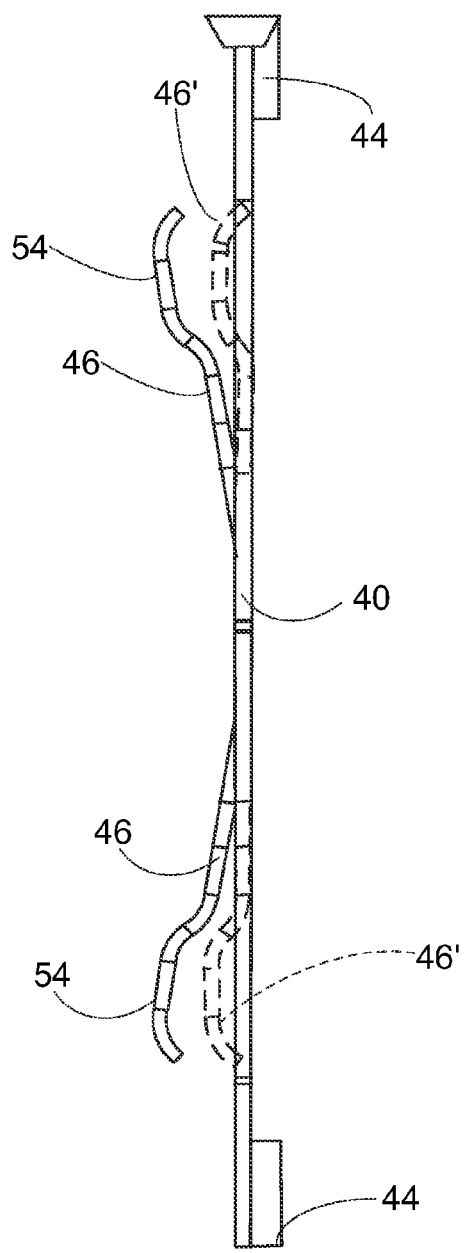
FIG. 11 shows a side view of the spring of FIGS. 8 and 9, with its overdeflected position shown in dashed lines.

The cantilevered springs can have various configurations. With reference to FIG. 11, the spring 46 of FIGS. 8 and 9 is again shown in profile in FIG. 11 (similar to FIG. 9). The spring 46 has a dual cantilever design with a contact surface 54 that contacts a fuel rod. In FIG. 11, the spring 46 is shown in an unloaded or normally loaded state, in which the spring 46 is undeformed or only slightly deformed. Also shown in FIG. 11, is an overloaded spring 46' (shown using a dashed lines). During nuclear reactor operation using springs such as those shown in FIG. 11, adverse handling conditions, seismic events, or other stresses can produce high accelerations on the fuel rods which in turn may over-deflect the springs 46 to the overdeflected configuration 46'. Springs 46' that are deflected past the normal fuel rod location may be plastically deformed and lose grip force on the fuel rod. Tests performed by the inventors show that three-fourths of the design grip force could be lost from such over-deflection.

Figure 12:
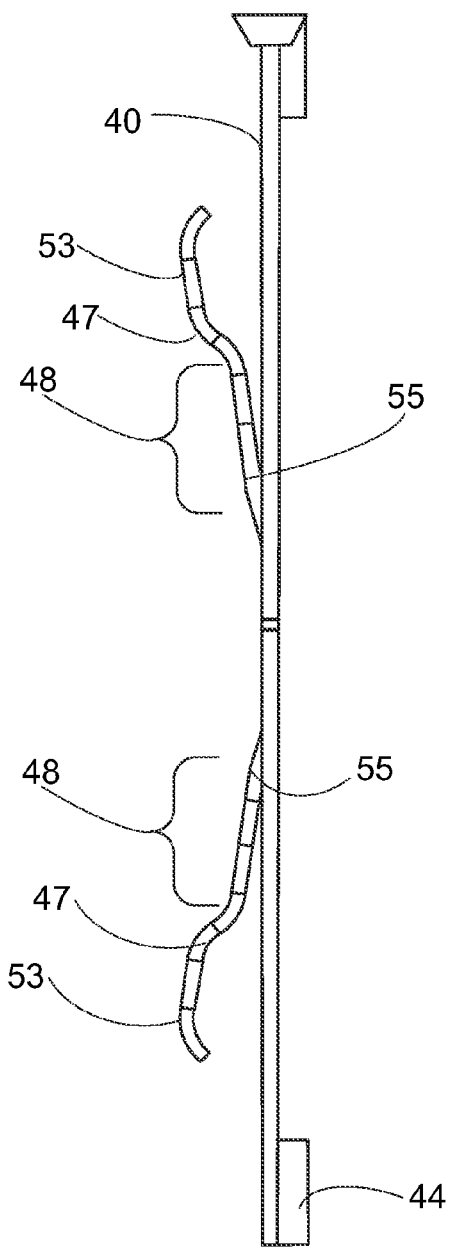
FIG. 12 shows a second spring embodiment that includes a travel-limiting bump.

With reference to FIG. 12, a second embodiment spring 47 is shown. The spring of FIG. 12 is designed to reduce or eliminate spring damage from handling loads. The spring 47 of FIG. 12 is a modified version of the spring shown in FIGS. 8, 9, and 11 having a secondary deformable region 48 formed at or near the base of the spring 47. The illustrative secondary deformable region 48 is formed as a bridge of the spring that runs approximately parallel with the plane of the strap 40 (although some deviation from parallel is contemplated). This bridge 48 generates a secondary deformable region (in effect, a secondary spring) that includes a second contact region in the form of an extra bump 55 in the spring (i.e., a proximate bump 55 that is more proximate to the base of the cantilevered spring compared with the spring contact surface 53 at the distal end of the spring 46 without the bridge, see FIG. 11). The bump 55 acts as a stop or travel limiter to prevent loss of grip force caused by excessive spring deflection. In general, the bump 55 is disposed closer to the base of the spring 47 than the contact surface 53 (i.e., between the base of the spring 47 and the distal contact surface 53) and is expected to exhibit greater stiffness compared with the distal end of the spring. The bump 55 and the contact surface 53 form two bumps or contact surfaces, with the contact surface 53 engaging the fuel rod in normal operation and the bump 55 engaging the fuel rod only during a deflection event (e.g., rough handling, seismic event or so forth).

The springs 46, 47 have been fabricated, and tests applied 150% design load on the springs. The spring 46 (FIG. 11) allowed the simulated fuel rod to bottom out against the strap 40 (corresponding to overdeflecting even greater than the illustrative overdeflected spring 46' shown in FIG. 11). The spring 47 of FIG. 12 which includes the travel limiting bumps 55 limited the over-deflection to one-half that of the spring 46. The spring 47 of FIG. 12 also retained 50% of its design grip force while the standard spring 46 retained only 25%.

The travel limiting feature 55 of the spring of FIG. 12 makes the fuel assembly more tolerant of abnormal handling loads, seismic loading, or other mechanical stresses. It will be appreciated that the spring of FIG. 12 is an illustrative example, and the detailed shape of the spring and of the travel-limiting feature may vary while retaining the disclosed advantageous configuration including a bridge region 48 with a (second) proximate bump 55 of high stiffness to limit spring travel. The improved spring design may be employed in substantially any cantilevered spring arrangement, e.g. a dual cantilever spring as in FIG. 12, or in a single spring arrangement or an "S" spring arrangement (e.g., FIG. 10).

Figure 13:
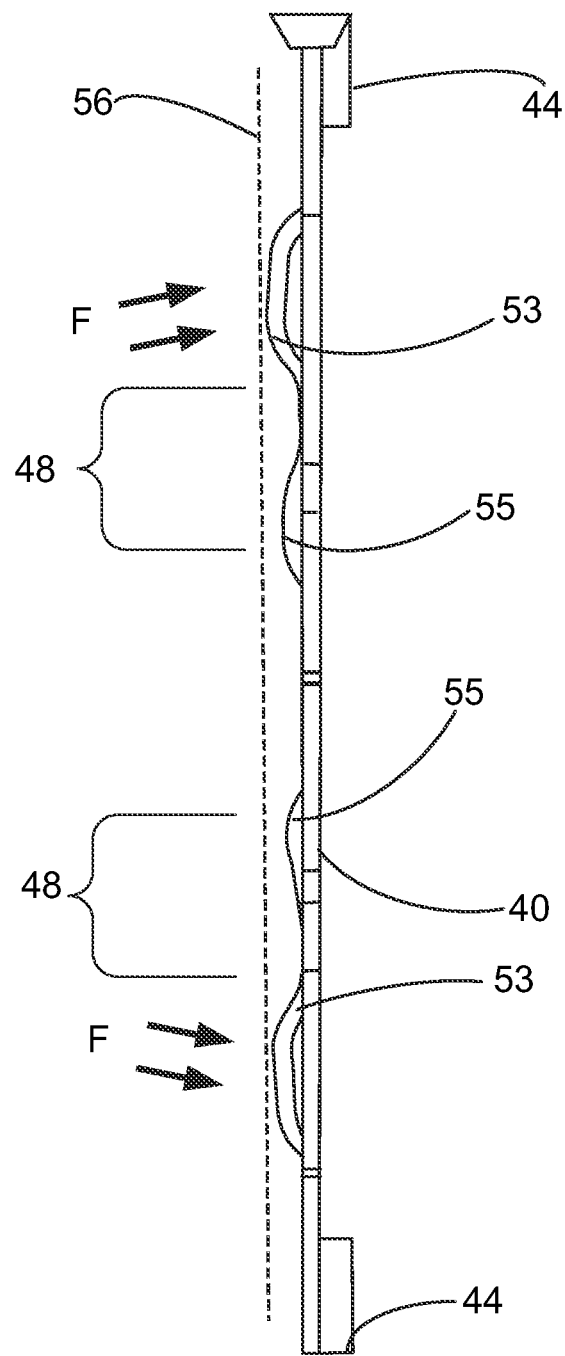
FIG. 13 shows the second spring embodiment of FIG. 12 under a force.

FIG. 13 shows the spring of FIG. 12 under a force F sufficient to compress the spring 47. In the deflection state shown in FIG. 13, the plane of fuel rod, shown by dashed line 56, has not (yet) deflected far enough to engage the bump 55, but slightly more force would cause the fuel rod to engage the bump 55. As stated above, the bump 55 acts as a stop or travel limiter to inhibit further fuel rod movement and to prevent the spring 47 from over-deflection. The bump 55 is closer to the base of the cantilevered spring 47 than the distal contact surface 53 that engages the fuel rod during normal operation, and the bump 55 provides a secondary contact surface having a higher stiffness than the distal contact surface 53. In some embodiments, the secondary deformable region 48 including the bump 55 has at least an order of magnitude higher stiffness (e.g., at least an order of magnitude higher spring constant) as compared with the primary deformable region comprising the cantilevered contact surface 53.

In one embodiment, the spring of FIG. 12 is only used on the outer-most of the interior straps 40. That is, there are exterior straps 42 having no springs and immediately inside those straps are the outer-most interior straps 40 bearing the springs 47 of FIGS. 12 and 13, with the remaining (i.e., further inward) straps 40 bearing the springs 46 of FIGS. 8, 9, and 11. Using the springs 47 with secondary deformable regions 48 only in the outer-most interior straps prevents overstressing the outermost springs if a fuel assembly is bumped. On the other hand, the spring 47 may add flow resistance when compared to the spring of FIGS. 8, 9, and 11, and hence in this embodiment the remaining (further inward) straps 40 use the springs 46 so as to provide enhanced primary coolant flow through the spacer grid.

In some embodiments, the spring 47 may be made of Zircaloy. In such an embodiment, the bump 55 should be as close as practical to the base of the spring allowing a gradual arc to the bridge area 48 in order to have a large bend radius, as Zircaloy has a higher minimum bend radius than, e.g., Inconel. In other embodiments, the improved spring may be manufactured of Inconel or another metal that is robust in the radioactive nuclear reactor core environment.

The spring embodiment 47 of FIGS. 12 and 13 includes a hooked shaped spring which allows for ease of manufacturing, particularly with more brittle materials such as Zircaloy. A spoon shaped embodiment, similar to FIG. 6, is alternatively contemplated, which may be advantageous with more ductile materials. Other shapes for the primary contact surface at the distal end of the cantilevered spring are also contemplated.

Figure 15:
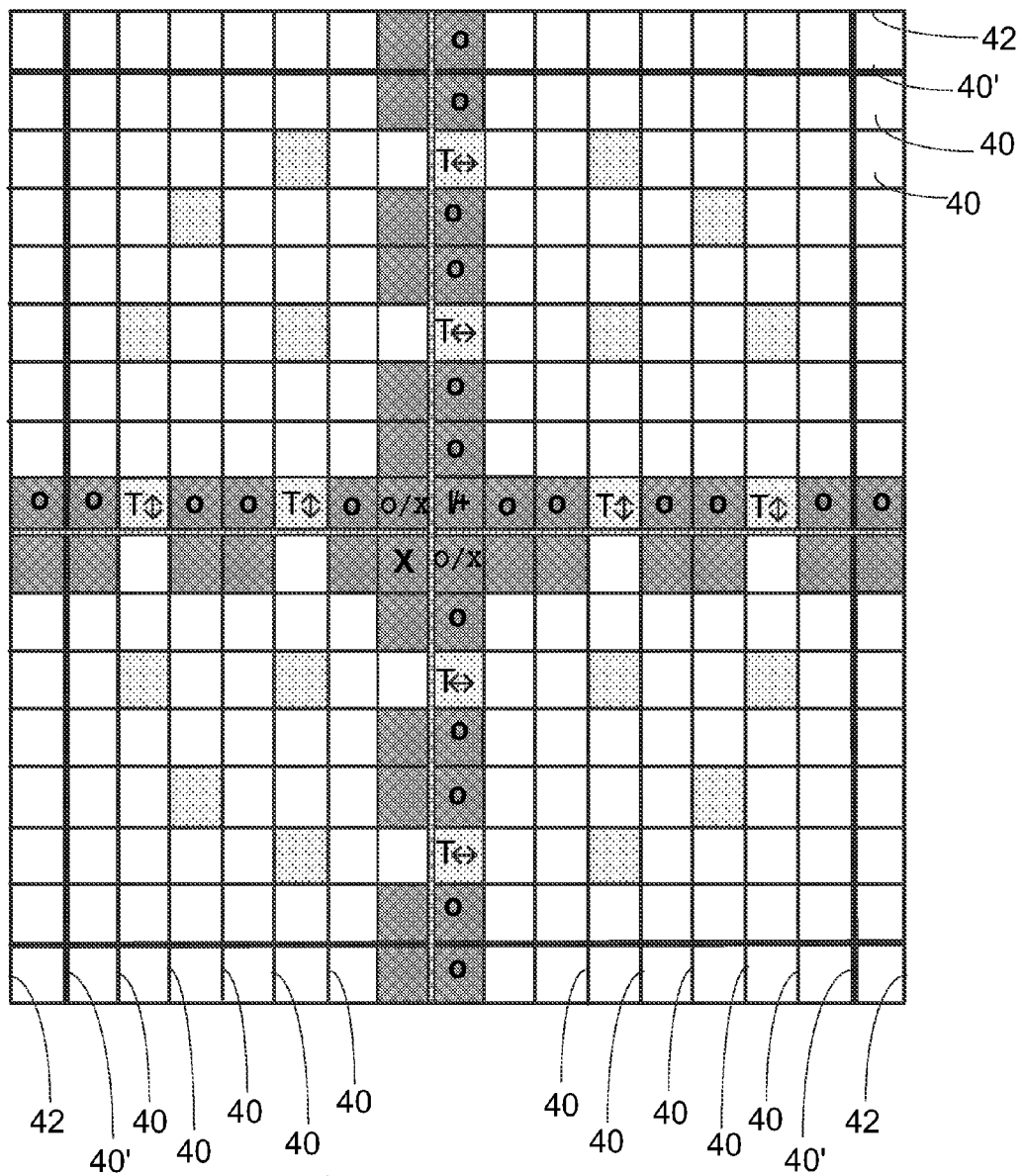
FIG. 15 shows a diagrammatic overhead view of an illustrative spacer grid.

With reference to FIGS. 14 and 15, an illustrative spacer grid design is shown as a diagrammatic overhead view using lines to represent straps viewed "on edge" from above (or below) the grid. Symbolic representations (e.g., hatching, cell labeling, line types, et cetera) shown in the key of FIG. 14 are used to identify relevant features such as guide tube locations, various types of fuel rod locations (differentiated based on number of springs), transition regions where springs transition from facing one direction to the opposite direction, and so forth. Cells designated for guide tubes are also labeled (where appropriate) to indicate transitions using the letter "T" along with a double-headed arrow indicating the transition direction, as defined in FIG. 14. In the example of FIGS. 15, it is assumed that the strap of FIG. 10 is employed at transitions so that some cells have missing springs (the number of missing springs in the cell being indicated by symbols defined in the key of FIG. 14). As set forth in the example of FIG. 15, by appropriate grid design the number of missing springs for any given cell along the transitions can be managed.

With continuing reference to FIG. 15, the illustrative grid design 60 is shown. In this design, some fuel rod cells at the transitions have single contact springs in one direction and double contact springs in the orthogonal direction. Since the ideal configuration is a fuel rod cell with dual contact springs in both directions, adjacent grids on the fuel assembly (in the vertical or "elevation" direction E denoted in FIG. 2) are preferably flipped diagonally (i.e. rotated 180 degrees about diagonally opposite corners) relative to each other to decrease the number of fuel rods that have single contact springs at every grid elevation. Despite the grid rotations, there will still be a limited number of fuel rod cells in the fuel assembly 20 that have a single contact spring in at least one direction at every grid elevation. These locations are marked with a "O" in FIG. 15 (see key of FIG. 14). Three fuel rod cells near the center of the baseline grid 60 will have a single contact springs in both directions. These locations are marked with an "X". Again, rotating adjacent grids will reduce, and in some embodiments eliminate, the number of fuel rods that have single contact springs in both directions. One cell of grid 60 will be occupied by an instrument guide tube. This cell is marked with an "I".

The illustrative baseline grid 60 includes the outer straps 42 and inner straps 40 of FIGS. 3-5, with no springs on the outer straps 42 and the springs 46 of FIGS. 8, 9, and 11 on inner straps 40. However, the outermost inner straps are different straps 40' in that they include the springs 47 of FIGS. 12 and 13. (Straps 40' are shown using thicker lines for emphasis in diagrammatic FIG. 15). Placement of these springs 47 at the outermost inner straps 40' ensures that the travel limiters 48 are provided at these outermost inner straps 40' that are likely to bear most of the force during a rough handling event, seismic event, or other mechanical overload event. The remaining inner straps 40, that is, the inner straps 40 that are inboard of the outermost inner straps 40', bear the springs 46 that do not provide travel limiter protection but that do increase flow rate (as compared with springs 47).

In the spacer grid design of FIG. 15, the springs 46 of the spacer grid have a lower spring constant (i.e. are less stiff) while the dimples 44 have a higher spring constant (i.e. are more stiff). In some embodiments, the springs have a spring constant that is no larger than one-half of the spring constant of the dimples. In some embodiments, the springs have a spring constant of 500 pounds/inch or less while the dimples have a spring constant of 1000 pounds/inch or higher. In some embodiments the travel limiters 48 provide at least an order of magnitude higher spring constant than the normally operating cantilevered spring surface 53. However, other spring constants and/or spring constant ratios are contemplated.

The design of FIG. 15 is an illustrative example, and numerous alternative layouts are contemplated. Some alternative layouts maintain the basic spring and dimple design but change the arrangement of these features within the grid. Other alternative layouts includes changes to the basic spring geometry and changes to the baseline spacer grid structural arrangement.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A nuclear reactor fuel assembly comprising: a spacer grid including a plurality of intersecting straps having springs and dimples formed into the straps, the intersecting straps defining cells with the springs and dimples arranged to engage fuel rods passing through the cells, wherein at least one of the springs in the spacer grid includes a single base anchored to the spacer grid both in a plane of a corresponding strap and at a mid-plane of the spacer grid and the at least one spring is cantilevered with a bridge region disposed between a distal end of the cantilevered spring and the base of the cantilevered spring, wherein the base of the cantilevered spring is disposed in the plane of the corresponding strap.

2. The fuel assembly of claim 1 wherein the bridge region is parallel with a plane of the strap.

3. The fuel assembly of claim 1 wherein the cantilevered spring includes a contact surface and the bridge region includes a bump spaced apart from the contact surface of the cantilevered spring, the bump being disposed along the cantilevered spring between the contact surface and the base of the cantilevered spring.

4. The fuel assembly of claim 3 wherein the contact surface of the cantilevered spring is less stiff than the bridge region including the bump.

5. The fuel assembly of claim 1 wherein at least some of the cantilevered springs are arranged as dual cantilevered springs disposed on a strap.

6. The fuel assembly of claim 1 wherein an outer strap of the intersecting straps do not include springs.

7. The fuel assembly of claim 6 wherein the outer straps of the plurality of intersecting straps include dimples.

8. The fuel assembly of claim 1 wherein the spacer grid includes outer straps that do not include springs and inner straps that all include springs, wherein only the outermost of the inner straps include the cantilevered springs with bridge regions disposed between distal ends of the cantilevered springs and bases of the cantilevered springs.

9. The fuel assembly of claim 1 further comprising fuel rods comprising fissile material held in a spaced apart arrangement by a plurality of spacer grids.

10. A nuclear reactor comprising a pressure vessel containing a nuclear reactor core wherein the nuclear reactor core includes fuel rods comprising fissile material held in a spaced apart arrangement by a plurality of spacer grids set forth in claim 1.

11. A nuclear reactor fuel assembly comprising: a spacer grid including a plurality of intersecting straps having springs and dimples formed into the straps, the intersecting straps defining cells with the springs and dimples arranged to engage fuel rods passing through the cells wherein at least one of the springs in the spacer grid includes a single base anchored to the spacer grid both in a plane of a corresponding strap and at a mid-plane of the spacer grid and the at least one spring is cantilevered with a first contact surface and a secondary contact surface formed by a bump, the secondary contact surface having at least an order of magnitude higher stiffness than the first contact point and located between the base of the spring and the first contact surface, wherein the base of the cantilevered spring is disposed in the plane of the corresponding strap.

12. The fuel assembly of claim 11 wherein: springs are not formed into the outer straps of the spacer grid, and dimples are formed into the outer straps of the spacer grid.

13. The fuel assembly of claim 11 wherein the springs have a spring constant that is no larger than one-half of the spring constant of the dimples and the secondary contact surface has a spring constant that is at least an order of magnitude higher than the spring constant of the springs.

14. The fuel assembly of claim 11 further comprising fuel rods comprising fissile material held in a spaced apart arrangement by a plurality of spacer grids.

15. A nuclear reactor fuel assembly comprising: a spacer grid including a plurality of intersecting straps having springs and dimples formed into the straps, the intersecting straps defining cells with the springs and dimples arranged to hold fuel rods passing through the cells, wherein at least one of the springs in the spacer grid includes a single base anchored to the spacer grid both in a plane of a corresponding strap and at a mid-plane of the spacer grid and the at least one spring is a cantilevered spring with a contact surface and a bump spaced apart from the contact surface and disposed along the cantilevered spring between the contact surface and the base of the cantilevered spring, the bump limiting travel of the spring, wherein the base of the cantilevered spring is disposed in the plane of the corresponding strap.

16. The fuel assembly of claim 15 wherein: springs are not formed into the outer straps of the spacer grid, cantilevered springs with the bump are formed into the most outboard of the inner straps of the spacer grid, and springs without the bump are formed into the inner straps of the spacer grid other than the most outboard of the inner straps.

17. The fuel assembly of claim 15 wherein the cantilevered spring with travel limiting bump is disposed in the outermost straps that are inside the outer straps.

18. The fuel assembly of claim 15 wherein the travel limiting bump has a spring constant that is at least an order of magnitude higher than the spring constant of the contact surface.

19. The fuel assembly of claim 15 further comprising fuel rods comprising fissile material held in a spaced apart arrangement by a plurality of spacer grids.

20. The fuel assembly of claim 15 wherein the cantilevered spring is made of one of Zircaloy and Inconel.

* * * * *